United States Patent
Lin et al.

(10) Patent No.: US 10,262,130 B2
(45) Date of Patent: Apr. 16, 2019

(54) SYSTEM AND METHOD FOR PROVIDING CRYPTOGRAPHIC OPERATION SERVICE IN VIRTUALIZATION ENVIRONMENT

(71) Applicants: INSTITUTE OF INFORMATION ENGINEERING, CHINESE ACADEMY OF SCIENCES, Beijing (CN); DATA ASSURANCE & COMMUNICATION SECURITY CENTER, CHINESE ACADEMY OF SCIENCES, Beijing (CN)

(72) Inventors: Jingqiang Lin, Beijing (CN); Kaijie Zhu, Beijing (CN); Lingchen Zhang, Beijing (CN); Bo Luo, Beijing (CN); Quanwei Cai, Beijing (CN); Congwu Li, Beijing (CN); Jiwu Jing, Beijing (CN); Wuqiong Pan, Beijing (CN)

(73) Assignee: DATA ASSURANCE & COMMUNICATION SECURITY CENTER, CHINESE ACADEMY OF SCIENCES, Beijing (CN)

( * ) Notice: Subject to any disclaimer, the term of this patent is extended or adjusted under 35 U.S.C. 154(b) by 0 days.

(21) Appl. No.: 15/551,083

(22) PCT Filed: Oct. 22, 2015

(86) PCT No.: PCT/CN2015/092562
§ 371 (c)(1),
(2) Date: Aug. 15, 2017

(87) PCT Pub. No.: WO2017/045244
PCT Pub. Date: Mar. 23, 2017

(65) Prior Publication Data
US 2018/0232519 A1    Aug. 16, 2018

(30) Foreign Application Priority Data
Sep. 15, 2015  (CN) .......................... 2015 1 0586037

(51) Int. Cl.
*G06F 21/53*    (2013.01)
*G06F 9/455*    (2018.01)
(Continued)

(52) U.S. Cl.
CPC .......... *G06F 21/53* (2013.01); *G06F 9/45558* (2013.01); *G06F 21/602* (2013.01);
(Continued)

(58) Field of Classification Search
None
See application file for complete search history.

(56) References Cited

U.S. PATENT DOCUMENTS 8,719,557 B2 * 5/2014 Dandekar ............... G06F 21/53
                                                     713/1
9,641,321 B1 * 5/2017 Leventhal ............. H04L 9/0637
(Continued)

*Primary Examiner* — Piotr Poltorak
(74) *Attorney, Agent, or Firm* — SV Patent Service

(57) ABSTRACT

A system and method for providing cryptographic operation service in a virtualization environment. In the system, a configuration subsystem provides an interface for an administrator and a common user to input information about a virtual cryptographic device. A key file storage subsystem stores a key file and protects it with the protection password. A virtual machine operating subsystem obtains a corresponding key file from the storage subsystem according to the input of the configuration subsystem, creates a virtual device for a guest virtual machine, and finally operates the guest virtual machine to provide cryptographic computing service for the guest virtual machine. Thus the administrator/the common user can specify a key file and input a protection password for a guest virtual machine via the corresponding interface to facilitate the creation of a virtual cryptographic device, and can manage the virtual cryptographic device in a user-friendly and centralized manner. The guest virtual machine on a virtualization management
(Continued)

platform can request for a secure cryptographic operation service, thereby alleviating the key security problem in virtualization environment.

10 Claims, 6 Drawing Sheets

(51) Int. Cl.
  *H04L 9/08* (2006.01)
  *H04L 9/32* (2006.01)
  *G06F 21/60* (2013.01)

(52) U.S. Cl.
  CPC ............ *H04L 9/088* (2013.01); *H04L 9/0816* (2013.01); *H04L 9/0822* (2013.01); *H04L 9/0863* (2013.01); *H04L 9/0894* (2013.01); *H04L 9/3242* (2013.01); *G06F 2009/45587* (2013.01); *G06F 2009/45591* (2013.01)

(56) References Cited

U.S. PATENT DOCUMENTS

| | | | |
|---|---|---|---|
| 10,078,754 B1* | 9/2018 | Brandwine | G06F 21/602 |
| 2010/0100721 A1* | 4/2010 | Su | G06F 11/1456 |
| | | | 713/150 |
| 2011/0051930 A1* | 3/2011 | Yeh | G06F 21/53 |
| | | | 380/45 |
| 2011/0107406 A1* | 5/2011 | Frost | G06F 9/45558 |
| | | | 726/6 |
| 2011/0154023 A1* | 6/2011 | Smith | G06F 21/78 |
| | | | 713/155 |
| 2011/0246785 A1* | 10/2011 | Linsley | G06F 21/53 |
| | | | 713/189 |
| 2011/0276806 A1* | 11/2011 | Casper | G06F 21/602 |
| | | | 713/189 |
| 2013/0058478 A1* | 3/2013 | Yeh | G06F 21/53 |
| | | | 380/44 |
| 2013/0061293 A1* | 3/2013 | Mao | G06F 21/53 |
| | | | 726/4 |
| 2014/0289535 A1* | 9/2014 | Gan | G06F 21/53 |
| | | | 713/189 |
| 2015/0358161 A1* | 12/2015 | Kancharla | H04L 63/0485 |
| | | | 713/164 |
| 2016/0014196 A1* | 1/2016 | Azulay | G06F 21/31 |
| | | | 726/3 |
| 2016/0148001 A1* | 5/2016 | Bacher | G06F 9/45558 |
| | | | 713/189 |
| 2017/0161505 A1* | 6/2017 | Campagna | G06F 9/45558 |
| 2017/0277903 A1* | 9/2017 | Christodorescu | G06F 21/79 |
| 2017/0300695 A1* | 10/2017 | He | H04L 29/06 |

* cited by examiner

SYSTEM AND METHOD FOR PROVIDING CRYPTOGRAPHIC OPERATION SERVICE IN VIRTUALIZATION ENVIRONMENT

TECHNICAL FIELD

The present invention belongs to the field of computer security, and in particular to a system and a method for providing cryptographic operation service in a virtualization environment.

BACKGROUND OF THE INVENTION

With the continuous development of cloud computing, virtualization technology has become more widely used. With virtualization technology, multiple virtual machines (VMs) can be run on a single physical computer platform at the same time. Virtualization technology has many advantages. First, Virtual Machine Monitor (VMM) can manage resources of the physical platform and monitor virtual machines running on it. Secondly, virtualization technology ensures that different virtual machines are isolated from each other and the service on a virtual machine does not affect other virtual machines. Finally, the virtual machine can be quickly and easily copied, moved, etc.

Virtualization technology can provide virtual desktop and other convenient and efficient services for the majority of network user groups. The groups involved in this model can be broadly divided into two categories: administrators and common users. Among them, an administrator is responsible for the maintenance and management of the back end for the entire virtualization environment. A common user only uses external virtual machine functions (such as virtual desktop) provided by the virtualization environment and does not have access right to the back end of the virtualization environment.

In the case of virtual desktops described above, administrators need to centrally manage multiple virtual machines in a virtualization environment. The current virtualization management platform mainly includes oVirt, RHEV, Xen-Center, Virt-Manager, etc., which uses virtualization management platform to conveniently build a virtualization environment on a number of physical platforms in a cloud computing environment, and effectively manage various types of resources under a unified and effective management, including especially the creation, copying, moving and backup, etc. of the virtual machines. The structure of the virtualization platform mainly includes the following components: the host, which is the physical platform on which the virtual machine is running, and which provides the actual hardware platform for the running of the virtual machine. A cloud computing environment can have multiple hosts, and each host can run multiple virtual machines. Due to the existence of virtual machine monitor, a host computer can run multiple independent guest virtual machines (guest VM), each of which has an independent virtual machine operating system and multiple applications. A management center (manager) is responsible for the unified management of the hosts, virtual machines, the network and other resources in the entire virtual platform environment. A storage system (storage) stores various types of data resources on a virtualization platform, including disk mapping of guest VM.

Nowadays the implementation of many computer applications depends on cryptography. For example, the cryptographic algorithm can achieve data encryption, integrity verification, certificate signing, and other applications. The basic assumption of a cryptographic algorithm is that an attacker cannot get a key, and only the key owner can access the key. But this assumption is often difficult to be guaranteed in the actual information system. In traditional computer systems, an attacker can steal a key using multiple types of attacks: on the one hand, an attacker can steal key data directly from the computer's memory using software or hardware attacks; on the other hand, an attacker can restore the key data using side-channel attacks and other indirect attack methods.

For protecting key, there are usually two solutions: one is the development of dedicated hardware for key storage, cryptographic operation and etc. But many cryptographic hardware cannot be adequately combined with virtualization environments, as they are difficult to be deployed on the virtualization environment platform.

Another solution is to use software to provide secure cryptographic operation services. Software-based cryptographic services are less costly, easier for the large-scale deployment, and can be combined with the virtualization environment. One such scheme is the virtual cryptographic device solution proposed by The Institute of Information Engineering of the Chinese Academy of Sciences. The scheme designs a virtual cryptographic device manager running in the virtual machine monitor to manage the available cryptographic devices (which can be implemented by the software cryptographic algorithm executed on the virtual machine monitor) on the host to create a virtual device providing cryptographic computation (known as a virtual cryptographic device, which stores keys assigned to a guest virtual machine) for use by the guest virtual machine. The guest virtual machine communicates with the virtual cryptographic device through a virtual device interface. When the guest virtual machine needs to perform a cryptographic computation, it sends a request to the virtual cryptographic device. The virtual cryptographic device manager completes the cryptographic computation, and returns the result of the computation to the guest virtual machine.

Specifically, the virtual cryptographic device scheme described above is exemplified by QEMU-KVM (called virtio-ct), as shown in FIG. 5. The main goal of virtio-ct is that all keys and sensitive intermediate states in the computation cannot be accessed by the guest virtual machine. The key is stored in the form of a file on the disk of the host, and the key entity is assigned to the guest virtual machine by specifying the path of the key file. The cryptographic computation is performed according to the message sent from the guest virtual machine, which directly calls the cryptographic algorithm software implementation to carry out the corresponding cryptographic computation. The virtual cryptographic device manager is implemented in QEMU-KVM, and integrated in the QEMU process. The passing of the computation request and the computation result between the virtual cryptographic device and the guest virtual machine is implemented with virtio technologies. Virtio's basic structure framework is shown in FIG. 6: in which the front-end driver (frontend, such as virtio-blk, virtio-net, etc.) is the driver program module in the guest virtual machine, whereas the back-end driver module is implemented in QEMU. In the implementation of QEMU-KVM, the front-end driver is virtio-ct, and the back-end handler calls the cryptographic algorithm software implementation (using the OpenSSL package in virtio-ct) for the corresponding cryptographic computation.

The front-end and back-end drivers also define two layers to support communication between the guest virtual machine and QEMU, including a virtual queue (virtqueues)

interface, which conceptually attaches the front-end driver to the back-end handler, which calls the lower-level virtio-ring so that the front-end driver and the back-end handler are in the same application binary interface (ABI: Application Binary Interface), can send and receive data from each other. Therefore, the virtual queue is treated as the convergence point between the guest virtual machine and the virtual machine monitor. Virtio-ct instantiated virtual queues can be divided into two categories by function: one for the virtual machine monitor and the guest virtual machine to pass between the device management message, and the other is used to pass the cryptographic service message. Each pair of virtual queues is connected to the virtual machine monitor and the guest virtual machine respectively, to support the guest virtual machine to send messages to the virtual machine monitor or to receive messages from it. Virtio-ring implements a ring buffer to hold execution information about the front-end and back-end handlers, and it can save multiple I/O requests for front-end drivers and deliver them to the back-end drivers for batch processing. In virtio-ct, the guest virtual machine dynamically applies for memory and sends the address through the PCI configuration interface to the virtual cryptographic device manager. The virtual cryptographic device manager obtains the virtual address of the memory area by adding an offset. The two parties can communicate through the shared memory area.

In contrast to conventional cryptographic computation in guest virtual machines, in virtio-ct, all the cryptographic computations are conducted in the virtual machine monitor. So even if an attacker has captured the guest virtual machine, it still cannot steal the cryptographic key. Thus cryptographic key security is accomplished in the virtualization environment.

Although the above-mentioned virtual cryptographic device solution solves the security problem of the cryptographic operation service to a certain extent, some problems still remain: the key file corresponding to the virtual cryptographic device is protected by the protection password, so when the guest virtual machine is started, the protection password input is required from the host side by an administrator responsible for the virtual cryptographic device. This does not provide convenient, user-friendly cryptographic service to the common users of the guest virtual machine, and cannot achieve centralized management. If the key file is stored in plain text, the administrator does not need to enter the protection password, but it cannot provide a secure cryptographic service. In view of the above described problems, there is a need for designing new systems and methods, which provides a unified, centralized management to the virtual cryptographic devices, and offers a user-friendly interface to the users of the virtual machines.

SUMMARY OF THE INVENTION

The present invention provides a method and a system for providing cryptographic service in a virtualization environment. The solution incorporates a secure cryptographic operation service (which is implemented by a virtual device) on a virtualization management platform. On the one hand, the virtualization management platform can conduct centralized management to virtual cryptographic devices, and provide a user-friendly interface. On the other hand, the virtualization platform can also provide secure cryptographic operation services for its managed guest virtual machines (such services are accomplished by a virtual cryptographic device), which solves security issues to keys in guest virtual machines.

In particular, the technical solution of the present invention is as follows:

A system that provides cryptographic operation services in a virtualization environment that includes the following three subsystems:

a configuration subsystem, deployed as a management center on the virtualization platform, that provides an interface for administrators and common users to provide input information related to a virtual cryptographic device, wherein the input information at the interface includes a key file name and a protection password, wherein the configuration subsystem is configured to assign a key (used to create a virtual cryptographic device) to a guest virtual machine. The configuration subsystem supports two different ways of key file assignment: (1) the key file name and the protection password are entered by the administrator, or (2) the key file name is entered by the administrator, and the protection password is input by the common user.

Key file storage subsystem: a storage system deployed on a virtualization platform for storing a key file (the key may be the private key of the asymmetric cryptographic algorithm or the symmetric key of the symmetric cryptographic algorithm). The key data in the key file is protected by a protection password. For example, the protection password can be input into a Hash algorithm, to generate 256 bit AES key, to encrypt data in the key file.

Virtual machine operating subsystem: it is deployed in each host device according to the input of the configuration subsystem. The virtual machine operating subsystem obtains the corresponding key file for the corresponding guest virtual machine from the key file storage subsystem, creates a virtual cryptographic device for the guest virtual machine, and runs the guest virtual machine, to provide cryptographic operation service for the guest virtual machine.

A method of providing a cryptographic operation service in a virtualization environment using the above system, the method comprising the steps of:

1) Inputting a key file name and a protection password configured for one of guest virtual machines by administrators and common users through a configuration subsystem; if the protection password is input by an administrator, inputting the protection password by the administrator while inputting the key file name; if the protection password is input by a common user, under the condition that the key file has been specified in advance by an administrator, inputting the protection password by the common user while the guest virtual machine is started. This information will eventually be transmitted to the virtual machine operating subsystem;

2) Obtaining, by the virtual machine operating subsystem, the key assigned to the guest virtual machine from the key file in the key file storage subsystem according to the key file name and the protection password input by the configuration subsystem; storing the key in the virtual machine monitor; and creating a virtual cryptographic device for the guest virtual machine and starting the guest virtual machine; and 3) When one of the guest virtual machines requires a cryptographic computation, it sends a request for cryptographic computation using a channel between the virtual cryptographic device and the guest virtual machine. The virtual machine monitor resolves the request for cryptographic computation; completes the cryptographic computation using the key assigned to the guest virtual machine and the input information of the guest virtual machine; and returns the result of the cryptographic computation through the channel back to the guest virtual machine.

The disclosed key file storage subsystem is implemented as a file system based on NFS (Network File System), or based on an iSCSI (Internet Small Computer System Interface) or FCoE (Fibre Channel over Ethernet) block device.

The present invention creates a virtual cryptographic device in a virtualization environment based on the key file as part of the virtualization resource. The configuration subsystem can assign the key file to each guest virtual machine. A single guest virtual machine can designate one or more key files. The same or different key files can also be designated between different guest virtual machines.

The key file in the present invention protects the contents of the file by the protection password so that the key can be obtained from the key file only if the protection password is known. The key file assigned to the guest virtual machine is specified by the administrator and can support the following two modes of key acquisition: (1) The key file name and the protection password are entered by the administrator, or (2) the key file name is entered by the administrator, and the protection password is entered by a common user.

The system and method for providing cryptographic operation services in a virtualization environment of the present invention has the following advantages:

1) Administrators/common users can specify a key file for a guest virtual machine at an interface, in order to create a virtual cryptographic device, and provide more user-friendly and centralized management to the virtual cryptographic devices, and 2) A guest virtual machine on a virtualization management platform can request a secure cryptographic operation service, which alleviates the key security issues caused by attacks on guest virtual machines.

DETAILED DESCRIPTION OF THE INVENTION

Figure 1:
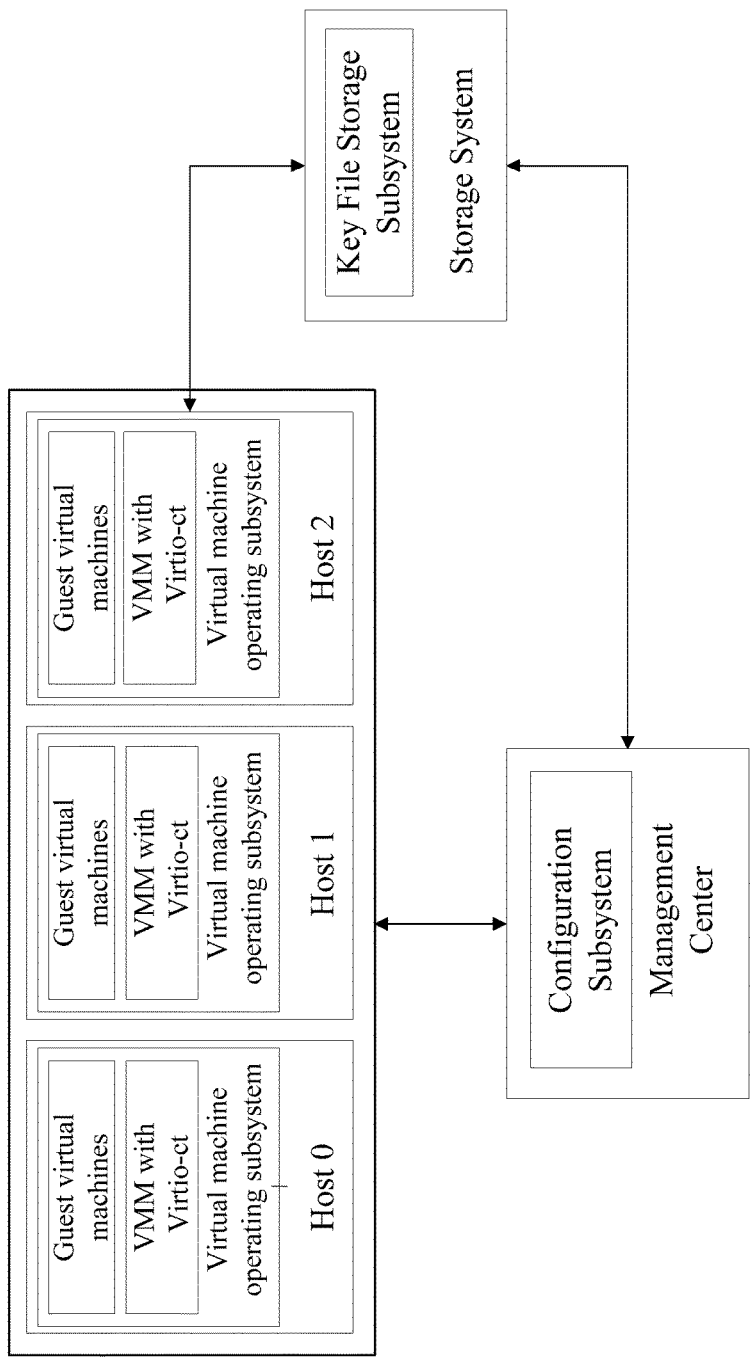
FIG. 1 shows a diagram for the components of a system that provides cryptographic operation services in a virtualization environment.

The present invention is applicable to all the virtualization management platforms such as oVirt, RHEV, Xen-Server, Virt-Manager, so on. The foregoing objects, features and advantages of the present invention will become more apparent from the following detailed description of the present invention when taken in conjunction with specific embodiments. FIG. 1 shows the components of the system, including a configuration subsystem, a key file storage subsystem, and a virtual machine operating subsystem.

In one implementation example, a cryptographic operation service is provided on the oVirt virtualization management platform.

Figure 2:
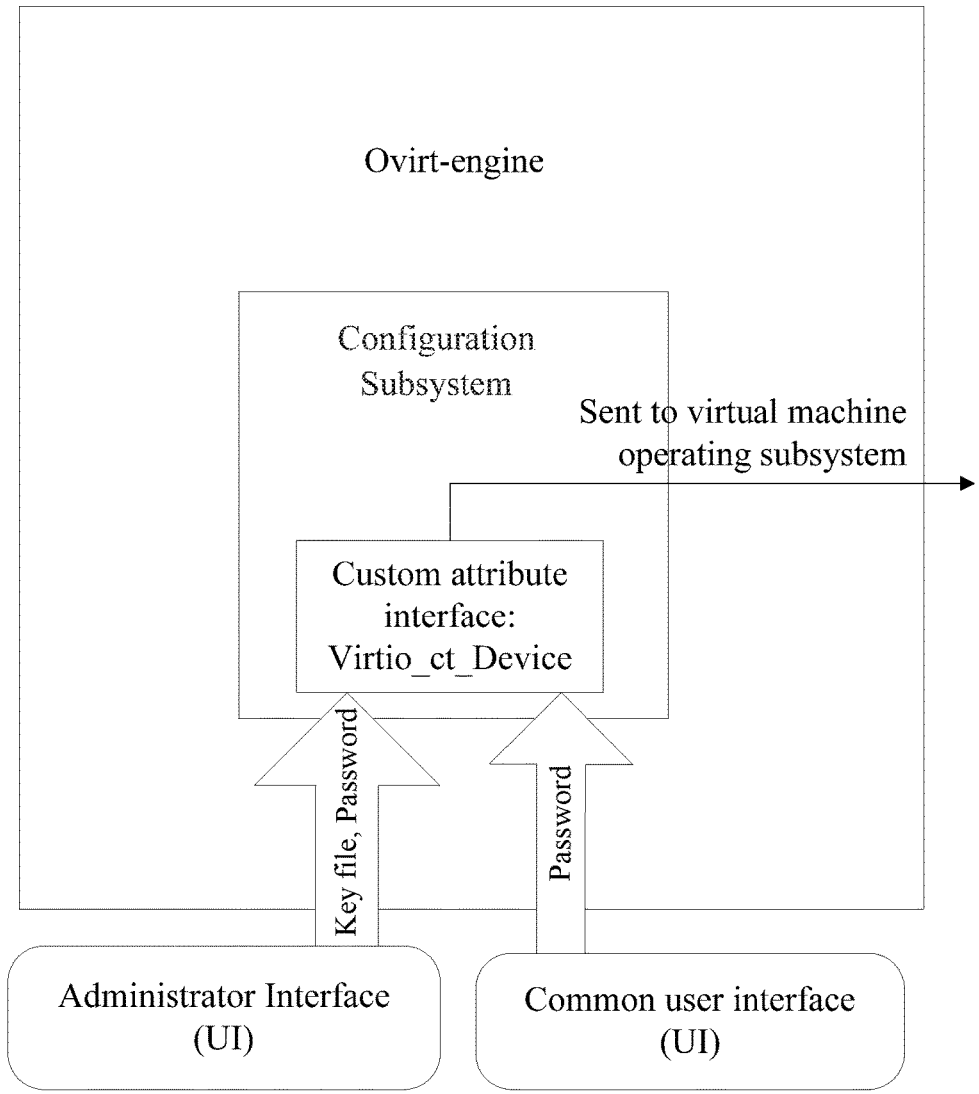
FIG. 2 is a schematic architecture diagram for an exemplified configuration subsystem in an implementation example.

FIG. 2 is a schematic architecture diagram for an exemplified configuration subsystem in the disclosed method. The goal of this subsystem is to provide a user-friendly interface so that the administrator/common user can enter information related to the virtual cryptographic device such as the key file name, the protection password corresponding to the key file, and assign the virtual cryptographic device to a specific guest virtual machine.

The configuration subsystem in this example is fused to the ovirt-engine of oVirt, which is implemented through the custom attribute interface that ovirt-engine provides. Ovirt-engine can be written in Java, and is the core part of oVirt. The main functions of the ovirt-engine can be summarized as follows: 1. the ovirt-engine communicates with the management interface tool, including verifying the legitimacy of the administrator or the common user and receiving administrative requests from the management interface tool. 2. ovirt-engine is responsible for managing and operating the resources on the virtualization environment platform, including the guest virtual machine, the guest virtual machine disk image, the network, and so on. 3. The ovirt-engine communicates with the host in the form of XML-RPC (XML Remote Procedure Call), and accomplishes the basic functions such as configuration, startup, pause, and migration of the guest virtual machines. OVirt provides web pages as a management interface tool to facilitate the operation of administrators and common users. In addition to the web pages, there is a management interface tool called the command line in the form of oVirt Cli, which allows administrators and common users to operate in command lines.

OVirt allows, at the ovirt-engine end, new custom attributes to be customized for guest virtual machines, and uses these custom attributes when the guest virtual machines are configured by administrative interface tools. When an administrator or a common user initiates a guest virtual machine through the administrative interface tool, the custom attributes are sent from the ovirt-engine to the host side along with the start request and is received by the virtual machine operating subsystem. The custom attributes in the ovirt-engine are used to define the variable Virtio_ct_Device used for transferring relevant parameters of the virtual cryptographic device. In the oVirt management interface tool, one can edit guest virtual machines, set the custom attribute Virtio_ct_Device, and enter the virtual cryptographic device information. Virtio_ct_Device will be forwarded to the host side during the startup of a guest virtual machine for further processing by the corresponding module in the virtual machine operating subsystem.

In this example, the configuration subsystem provides a configuration interface for two cases of key file assignments: when the protection password must be entered by an administrator, the administrator simply enters the key file name and the protection password for Virtio_ct_Device through the Web administration page. When the protection password must be entered by a common user, the command line management interface tool oVirt Cli in the present example provides an input interface for the common user to input a protection password. Specifically, the administrator still assigns the key file to the guest virtual machine through the web management page, while the common user logs in to oVirt Cli, using the command line to start the guest virtual machine. At this time, the oVirt Cli displays a prompt for "Enter protection password for the key file". The common user may then enter the protection password.

Figure 3:
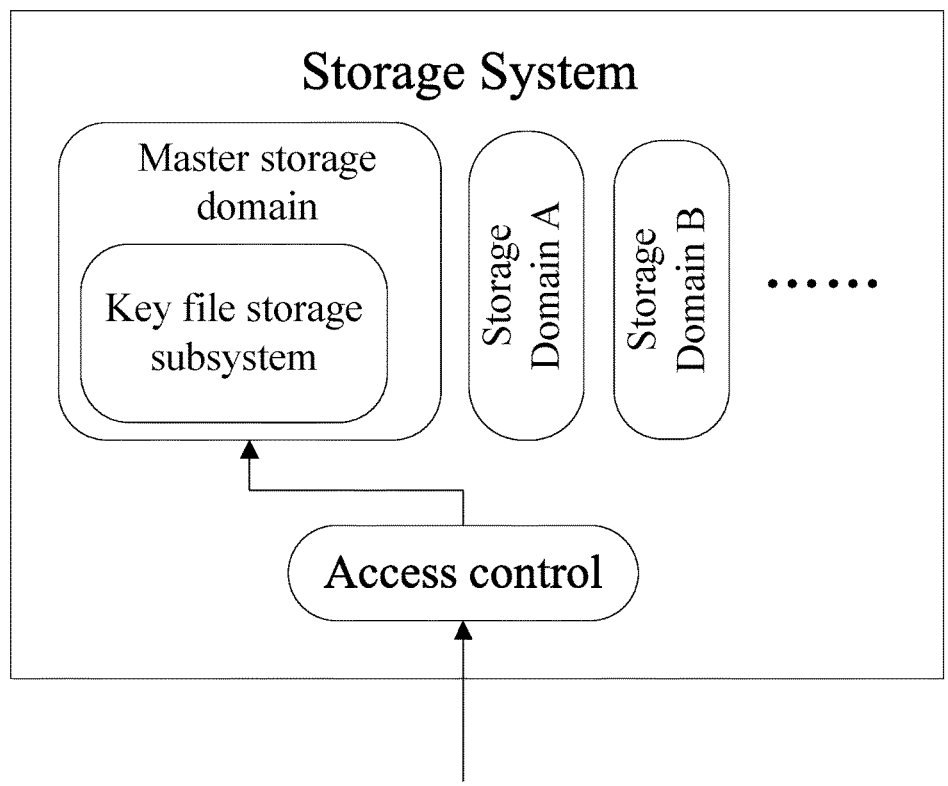
FIG. 3 is a schematic architecture diagram for an exemplified storage subsystem in an implementation example.

FIG. 3 is a schematic architecture diagram of the key file storage subsystem in the presently disclosed method. The goal of this subsystem is to securely store key files.

The key file storage subsystem in this example is incorporated into the storage system portion of oVirt. The storage system stores the guest virtual machine disk image and related important resources (virtual network data, etc.). Common components in the oVirt storage system architecture include storage domain, storage pool, master storage domain, and so on. The storage domain is the most basic storage entity used to store a guest virtual machine disk image and a corresponding metadata (a set of data that describe the data size, status, locks, etc. of the virtual image). The storage pool is a collection of storage domains that can perform cross-domain operations (reference, backup, restore, merge, etc.). Each storage pool must select a storage domain to hold all metadata, asynchronous requests, task data, etc.; such storage domain is called the master storage domain.

In the present example, all storage domains, including the master storage domain, are created using NFS. In the directory corresponding to each master storage domain, a corresponding folder is created to store the key file, and use the NFS access control mechanism to protect the key file, which implements the key file storage subsystem.

Figure 4:
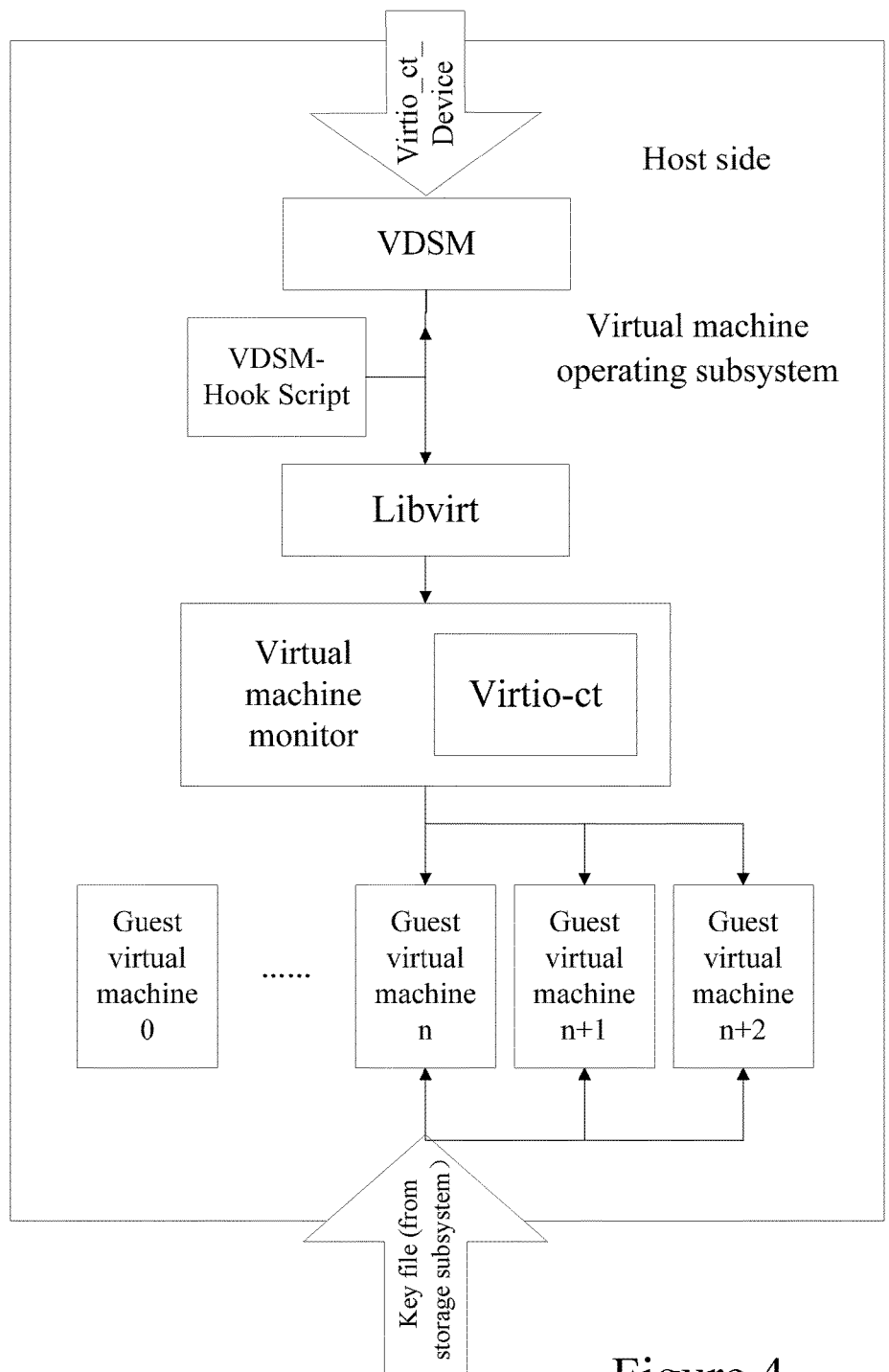
FIG. 4 is a schematic architecture diagram for an exemplified virtual machine operating subsystem in an implementation example
Figure 5:
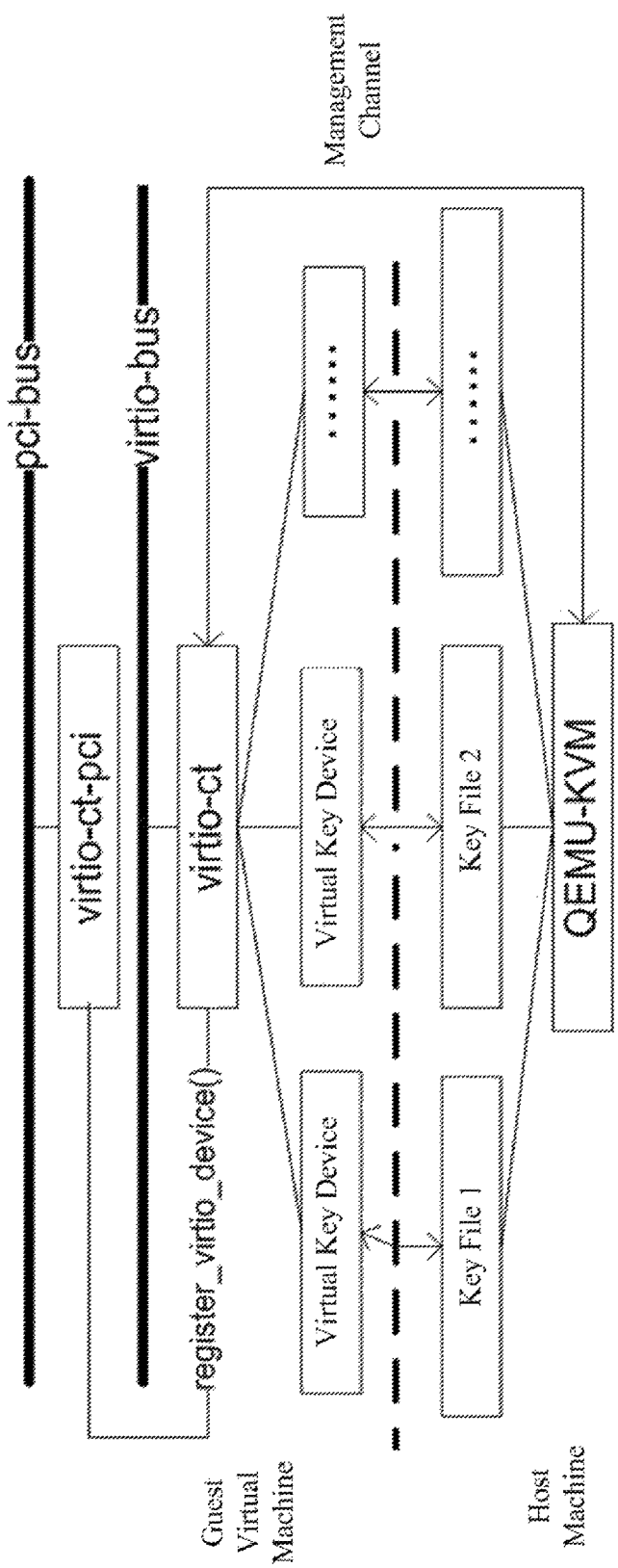
FIG. 5 shows a schematic diagram of virtio-ct providing cryptographic operation service in a virtualization environment.
Figure 6:
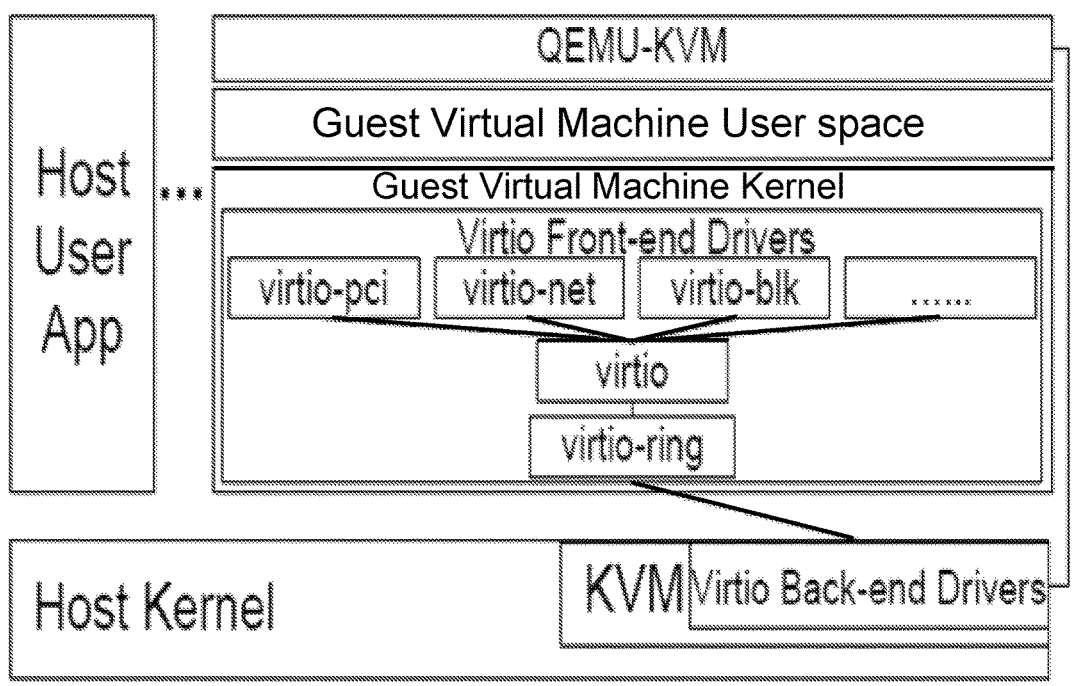
FIG. 6 is a schematic diagram of virtio architecture.

FIG. 4 is a schematic diagram of the virtual machine operating subsystem in this method. The goal of the virtual machine operating subsystem is to create a virtual cryptographic device for the guest virtual machine and start the guest virtual machine so that the guest virtual machine can request a secure cryptographic operation service.

In this example, the virtual machine operating subsystem is deployed on each host on the oVirt platform. VDSM (Virtual Desktop Server Manager) and Libvirt are the main components of the cooperation in the hosts. The host runs a virtual machine monitor VMM (described below using QEMU-KVM as an example).

1) VDSM, written in Python, is used to manage the hosts and guest virtual machines. The main functions of VDSM include the following: 1. VDSM monitors and manages the host storage, memory, network and other resources. 2. VDSM helps to complete the creation of guest virtual machines, statistical data collection, log collection and other management tasks. VDSM receives an XML-RPC call from the ovirt-engine and defines the guest virtual machine in the Libvirt domain XML format, eventually sending it to Libvirt to complete the corresponding operation of the guest virtual machine. In addition, VDSM also provides an extensible interface called VDSM-HOOK, which will be described in detail later.

2) Libvirt is a toolkit for interacting with multiple virtualization implementations under Linux. In oVirt, Libvirt uses the Libvirt domain XML sent from VDSM which describes the guest virtual machine to generate the corresponding QEMU command line, calls the corresponding function of QEMU-KVM, so as to achieve direct management and configuration for the guest virtual machine. The goal of Libvirt is to provide a common and stable management interface for different virtualization implementations. Therefore, although most major work and research on oVirt are based on QEMU-KVM, it is also compatible with other types of virtualization implementations.

In this example, the creation of the virtual cryptographic device in the virtual machine operating subsystem is done by the extended VDSM-Hook script. VDSM-Hook is an extensible interface provided by VDSM that allows developers to perform specific functions at specific stages of VDSM or guest virtual machine running cycles by writing Python scripts. Specifically, when the guest virtual machine enters a specific phase of the running cycle (for example, before the guest virtual machine starts), it will check if there is a corresponding Hook script at this checkpoint: if it exists, the contents of the Hook script will be executed. After the execution, the guest virtual machine's running cycle continues. Therefore, this scheme provides a Hook script which is executed before the guest virtual machine starts, to adjust and modify Libvirt domain XML that describes the guest virtual machine, in order to achieve Virtio-ct call and management.

In the present example, the specific work completed by VDSM-Hook mainly includes the following two areas:

1) Obtain a key file name and a protection password transferred from the configuration subsystem to the host VDSM-Hook script reads Virtio_ct_Device, and then obtains the key file name and protection password, in order to complete the configuration of the virtual cryptographic device afterwards.

2) Add parameters related to Virtio-ct.

VDSM-Hook can add Virtio-ct-related content to the Libvirt domain XML that describes the guest virtual machine, allowing Libvirt to generate the corresponding QEMU command line to create a virtual cryptographic device for the guest virtual machine.

In the Libvirt domain XML format, the <qemu: commandline> and <qemu: arg> elements allow the developer to directly define the command-line arguments to be added. Using these two elements, as well as the key file name and protection password obtained in (1), one can add the content of creating the virtual cryptographic device for the guest virtual machine in the Libvirt domain XML, which describes the profile of the guest virtual machine. Therefore, a virtual cryptographic device can be created successfully for the guest virtual machine that is started by Libvirt.

In this example, the specific operation flow to provide the cryptographic operation service is as follows:

1) The administrator uses the configuration interface tool to input the key file name assigned to the guest virtual machine through the configuration subsystem, and then the administrator or the common user enters the protection password corresponding to the key file through the corresponding interface.

2) The entered key file name and the protection password are stored in the custom attribute Virtio_ct_Device and sent to the virtual machine operating subsystem.

3) VDSM-Hook script in the virtual machine operating subsystem selects the corresponding key file from the storage subsystem according to the information in Virtio_ct_Device, creates the virtual cryptographic device for the guest virtual machine, and starts the guest virtual machine. This completes the work of creating a virtual cryptographic device for the guest virtual machine. The guest virtual machine can request a secure cryptographic operation service through the virtual cryptographic device.

The present invention may also be implemented in an environment based on other virtualization solutions. We take a virtualization environment based on Xen (another VMM tool instance) as an example:

The Xen-based virtualization environment architecture is built using XenServer and XenCenter. XenServer is a Xen-based virtualization server developed by Citrix that is installed on each host in the form of an operating system to provide a Xen-based virtualization environment. XenCenter is a Xen-based virtualization management center. Through XenCenter, an administrator can remotely manage, create, run, configure, and shut down the guest virtual machine for the entire virtualization environment. In terms of storage, XenCenter can configure local storage for each XenServer or configure a shared network store.

One can use the following approach to implement the disclosed solution based on Xen:

To implement a virtio-ct virtual cryptographic device like in QEMU-KVM in a Xen environment, front-end device drivers are deployed in XenServer guest virtual machines; back-end handlers are deployed in Xen's privileged domain. The off-the-shelf XenBus and XenStore technologies are used to enable the transfers of cryptographic computation requests and results between the front-end and the back end. The configuration subsystem is deployed in XenCenter to provide an interface for administrators and common users to enter key file names and protection passwords, and assign the file names to specific guest virtual machines. The key file storage subsystem is deployed in the network storage specified by XenCenter, in order to achieve the key file storage. The virtual machine operating sub-system is deployed in XenServer, which enables XenServer to configure the input information to the subsystem and create virtual cryptographic devices for the guest virtual machines.

The foregoing description of the embodiment is provided for illustration only, rather than for the purpose of limiting, the technical solutions of the present invention. One of ordinary skill in the art may modify or vary the exemplary embodiment without departing from the spirit and scope of the present invention. The scope of the present invention should be subject to the claims.

What is claimed is:

1. A system for providing cryptographic operation service in a virtualization environment, comprising:
    a configuration subsystem that provides an interface for administrators and common users to provide input information related to a virtual cryptographic device, wherein the input information at the interface includes a key file name and a protection password configured for a guest virtual machine, which the configuration subsystem is configured to assign a virtual cryptographic device to the guest virtual machine;
    wherein if the protection password is input by an administrator, inputting the protection password by the administrator while inputting the key file name; and
    if the protection password is input by a common user, under the condition that the key file has been specified in advance by an administrator, inputting the protection password by the common user while the guest virtual machine is started;
    a key file storage subsystem configured to store a key file in which a key is protected by the protection password; and
    a virtual machine operating subsystem configured to obtain the key file from the key file storage subsystem and to create the virtual cryptographic device for the guest virtual machine according to the input information at the configuration subsystem, and to run the guest virtual machine, wherein the guest virtual machine requests for a secure cryptographic operation service through the virtual cryptographic device.

2. The system of claim 1, wherein the key file storage subsystem is implemented as a file system based on NFS, or based on an iSCSI or FCoE block device.

3. The system of claim 1, wherein the configuration subsystem is configured to assign a key file to each of a plurality of guest virtual machines, wherein each of the plurality of guest virtual machines is designated with one or more key files, wherein different ones of the plurality of guest virtual machines are designated with a same key file or different key files.

4. The system of claim 1, wherein the protection password is extended to a 256-bit AES key using a Hash algorithm, which is used to encrypt or decrypt data in the key file.

5. The system of claim 1, wherein the cryptographic operation service is implemented through the virtual cryptographic device on a virtualization management platform including oVirt, RHEV, Xen-Server, or Virt-Manager.

6. The system of claim 5, wherein the cryptographic operation service is implemented on an oVirt virtualization management platform, wherein the configuration subsystem is fused to ovirt-engine portion of the oVirt virtualization management platform and is implemented by a custom attribute interface provided by the ovirt-engine, wherein the key file storage subsystem is integrated with storage system of the oVirt virtualization management platform, wherein the master storage in each data center creates a folder to store the key file, wherein the key file is protected using NFS security mechanisms, wherein the virtual operating subsystem is integrated with host side of the oVirt virtualization management platform, and is configured to create the virtual cryptographic device using VDSM-Hook script.

7. A method for providing cryptographic operation service in a virtualization environment in a system recited in claim 1, comprising:
    1) inputting a key file name and a protection password configured for a guest virtual machine by administrators and common users through a configuration subsystem; if the protection password is input by an administrator, inputting the protection password by the administrator while inputting the key file name; if the protection password is input by a common user, under the condition that the key file has been specified in advance by an administrator, inputting the protection password by the common user while the guest virtual machine is started;
    2) obtaining, by the virtual machine operating subsystem, the key assigned to the guest virtual machine from the key file in the key file storage subsystem according to the key file name and the protection password input by the configuration subsystem; storing the key in the virtual machine monitor; and creating a virtual cryptographic device for the guest virtual machine and starting the guest virtual machine; and
    3) when the guest virtual machine requires a cryptographic computation, sending a request for cryptographic computation using a channel between the virtual cryptographic device and the guest virtual machine; resolving the request for cryptographic computation by the virtual machine monitor; completing the cryptographic computation using the key assigned to the guest virtual machine and the input information of the guest virtual machine; and returning the result of the cryptographic computation through the channel back to the guest virtual machine.

8. The method of claim 7, further comprising:
    implementing the key file storage subsystem as a file system based on NFS, or based on an iSCSI or FCoE block device.

9. The method of claim 7, further comprising:
    assigning a key file to each of a plurality of guest virtual machines by the configuration sub system;
    designating each of the plurality of guest virtual machines with one or more key files; and
    designating different ones of the guest virtual machines with a same key file or different key files.

10. The method of claim 7, further comprising:
using a Hash algorithm to extend the protection password for a 256-bit AES key, which is used to encrypt or decrypt data in the key file.

* * * * *